(12) United States Patent
Brandes et al.

(10) Patent No.: US 7,532,866 B2
(45) Date of Patent: *May 12, 2009

(54) CLOSED-LOOP ANTENNA DIVERSITY IN A CELLULAR RADIO COMMUNICATION SYSTEM

(75) Inventors: Denis Brandes, Wendeburg (DE); Bernhard Raaf, Munich (DE); Ralf Wiedmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/861,058

(22) Filed: Sep. 25, 2007

(65) Prior Publication Data

US 2008/0009323 A1 Jan. 10, 2008

Related U.S. Application Data

(63) Continuation of application No. 10/478,032, filed as application No. PCT/DE02/01381 on Apr. 12, 2002, now Pat. No. 7,289,769.

(30) Foreign Application Priority Data

May 15, 2001 (DE) ................................ 101 23 611

(51) Int. Cl.
*H04B 1/00* (2006.01)
*H04B 7/00* (2006.01)

(52) U.S. Cl. .................... 455/69; 455/456.5; 455/456.6; 455/550.1; 375/295; 375/299; 370/334; 370/335

(58) Field of Classification Search ............ 455/69, 455/456.5, 456.6, 550.1, 562.1, 561; 375/295, 375/267, 299; 370/334, 335

See application file for complete search history.

(56) References Cited

U.S. PATENT DOCUMENTS 6,192,256 B1 2/2001 Whinnett

| 6,353,638 | B1 | 3/2002 | Hottinen et al. |
| 2002/0013130 | A1* | 1/2002 | Kim et al. ............... 455/70 |
| 2002/0115473 | A1 | 8/2002 | Hwang et al. |

FOREIGN PATENT DOCUMENTS

| WO | WO 00/72464 | 11/2000 |
| WO | WO 01/28128 | 4/2001 |

OTHER PUBLICATIONS

XP-002207980—Universal Mobile Telecommunications System (UMTS); Physical layer procedures (FDD) (3G TS 25.214 version 3.1.1 Release 1999).

* cited by examiner

*Primary Examiner*—Tuan A Pham
(74) *Attorney, Agent, or Firm*—King & Spalding LLP

(57) ABSTRACT

A method is provided for operating a cellular radio communication system with a base station, which may be switched between an operating state without closed-loop antenna diversity and an operating state with closed-loop antenna diversity, emitting a downlink signal with a weighting vector and a user station, for receiving the downlink signal and transmitting an uplink signal to the base station, delivering back-coupling information to the base station in the operating state with closed-loop antenna diversity, representing a determined weighting vector. On transition of the radio communication system into the operating state with closed-loop antenna diversity, the user station delivers back-coupling information, representing a weighting vector determined and known before the transition into the operating state with closed-loop antenna diversity, to the base station until a current weighting vector is determined by measurement, and then delivers the back-coupling information representing the current weighting vector.

4 Claims, 4 Drawing Sheets

FIG 1

CLOSED-LOOP ANTENNA DIVERSITY IN A CELLULAR RADIO COMMUNICATION SYSTEM

BACKGROUND

The present application is a continuation of U.S. patent application Ser. No. 10/478,032, filed Nov. 17, 2003, the contents of which is incorporated in its entirety herein.

The present invention relates to a method for operating a cellular radio communication system which supports antenna diversity and temporary transmission interruptions, and further relates to user and base stations for such a system.

In a radio communication system with antenna diversity in which two stations communicate with one another by radio, at least one of these stations is fitted with multiple antennas and is able to emit a radio signal for transmission to the other respective station via the individual antennas, weighted in each case with the coefficients of a weighting vector, so as to achieve a radiation pattern of the radio signal selectively adjusted to the other station. The information needed in order to adjust the weighting vector successfully is measured by the other station and delivered as back-coupling information to the first station.

A known system operating in this manner is the UMTS mobile radio communication system. This system has, in addition to open-loop operating states which do not need back-coupling information, two operating states with closed-loop antenna diversity, hereinafter designated closed-loop mode 1 and closed-loop mode 2. In an operating state without closed-loop antenna diversity, the user stations of the UMTS system generally do not carry out the measurements which are necessary in order to determine the back-coupling information since this is not required in an open-loop operating state or possibly may not even be measurable. If, however, a switch is made to a state with closed-loop antenna diversity, then from the outset a weighting vector must be available which the base station can use for transmitting to the user stations. Default weighting vectors are therefore state with antenna diversity and which, as the user stations deliver back-coupling information to the base station, are replaced by current weighting vectors.

The transition to an operating state with antenna diversity may relate both to the entire base station and all user stations connected to this base station and to an individual user station which is connected to a base station. The latter is the situation which occurs more frequently in practice.

After the transition to one of the states in closed-loop antenna diversity, the UMTS base station assumes that an uplink signal which it receives from a user station will contain back-coupling information via which it is able to select a current weighting vector which is well suited to the user station's actual reception conditions.

Temporary interruptions in the uplink and downlink signals may be necessary in mobile radio communication systems in order to enable a user station to carry out field strength measurements on radio signals of neighboring base stations and to check whether one of these neighboring base stations possibly delivers better reception conditions than the base station, designated here as the partner station, with which the user station is presently communicating.

In the case of a simple user station in which the transmitting and receiving sections cannot be tuned independently of one another, the transmitting section must be detuned during the measurements of the signal of the neighboring station so that interruptions here occur simultaneously in the downlink and the uplink respectively.

In such a case, the closed-loop operating state can be initialized after the end of the interruption in the same way as when switching to a state with closed-loop antenna diversity from another operating state.

In order to enable a user station with a single receiving section to carry out measurements on signals of neighboring base stations, an interruption of the downlink signal is unavoidable since the receiving section has to be tuned in order to carry out the measurements to the frequency of the neighboring base station and cannot in this period track the signal of the partner station. If the transmitting section of the user station can be tuned independently of the receiving section, then during the downlink interruption transmission can continue in the uplink.

In a user station with multiple receiving sections, one of which can remain constantly tuned to the downlink signal of the partner station and the second of which can be used for measurements of neighboring base stations, downlink interruptions are not necessary. However, temporary interruptions of the uplink signal may be necessary if transmission of the uplink signal would disrupt the measurements to be carried out; e.g., due to closely adjacent frequencies.

In order to make optimum use of the transmission capacity of a mobile radio communication system, it is of course desirable to limit as far as possible the extent of uplink or downlink interruptions which are associated with measurements of signals of neighboring stations and to allow interruptions independent of one another only in the uplink or only in the downlink. However, this raises a number of problems. Firstly, during an uplink interruption, the user station cannot deliver the back-coupling information which the base station needs in order to be able to continue to transmit the downlink signal to the user station. Secondly, the user station is unable during a downlink interruption to carry out the necessary measurements which are required in order to determine the back-coupling information.

In addition, consideration also must be given to the situation where a transition to an operating state with closed-loop antenna diversity falls within an interruption in the uplink and/or downlink transmission. Regardless of whether only the uplink, only the downlink or both are interrupted, the base station has from the start of the closed-loop operating state until the end of the interruption no current back-coupling information available to it with which it could control beam profiling.

For the reasons stated, with the conventional UMTS system, an optimum transition between operating states with and without closed-loop antenna diversity is possible only if the base station's communication with the user stations affected by the transition is not being interrupted. Ensuring this considerably complicates switching between operating states with and without closed-loop antenna diversity. If a base station serves a large number of user stations, then it is practically impossible to effect a change of operating state for all user stations simultaneously, since there usually will always be one among them whose communication is temporarily interrupted.

An object of the present invention is, therefore, to provide a method for operating a cellular radio communication system, a user station and a base station for such a system which support interruptions in the downlink and uplink signal independently of one another, and at any times, and which enable the system to switch between states with and without closed-loop antenna diversity in a simple way and regardless of possible transmission interruptions.

SUMMARY

Accordingly, if in the event of an uplink interruption, the present invention provides that transmission is to continue in the downlink, and that the base station will weight the downlink signal with a weighting vector determined in advance until such time as it receives new back-coupling information after the end of the interruption.

The determined weighting vector usefully may be the weighting vector represented by the last back-coupling information received by the base station before the interruption.

In a radio communication system which can be switched between an operating state without closed-loop antenna diversity, and the operating state with closed-loop antenna diversity it can arise that such a vector does not exist because the switch to the operating state with closed-loop antenna diversity has not been made until the interruption of the uplink signal. In such systems, a default weighting vector is generally defined which is used for weighting the downlink signal in the first time slot after the switch if no back-coupling information is yet available at the base station. In this case, the determined weighting vector is usefully the same as the default vector.

If the determined weighting vector is the weighting vector represented by the last back-coupling information received by the base station before the interruption, different variants arise. If the back-coupling information includes words consisting of multiple bits and which can be delivered distributed across multiple time slots of the uplink signal, then the last complete word of back-coupling information which was delivered before the interruption in the uplink signal can be interpreted as the last back-coupling information received. In other words, a part of the back-coupling word which was transmitted immediately before the interruption is not taken into consideration when determining the weighting vector. Alternatively, the last word of the back-coupling information, delivery of which commenced before the interruption of the uplink signal, can be taken as the last back-coupling information received, even if it was not transmitted fully. Such a procedure is useful, such as in a UMTS system, if the operating state with closed-loop antenna diversity is closed-loop mode 2.

If in the event of a downlink interruption, the uplink transmission is to be continued, whereupon the base station delivers back-coupling information in the uplink signal to the base station, which back-coupling information represents a weighting vector determined before the interruption. The evaluation of the uplink signal at the base station is then, irrespective of possible downlink interruptions, always the same.

In an embodiment, back-coupling information can be made available immediately to the base station of the radio communication system after transition to an operating state with closed-loop antenna diversity, which information enables this base station to determine a weighting vector and to use the weighting vector for directional transmitting, irrespective of whether or not the user station already has had the opportunity after the transition to the operating state with closed-loop antenna diversity to carry out a measurement necessary for generating current back-coupling information. If the opportunity has not arisen, and until such time as it does, the user station will deliver back-coupling information to the base station, which back-coupling information represents a weighting vector determined before the transition to the operating state with closed-loop antenna diversity.

According to another embodiment, the back-coupling information involved is back-coupling information which represents exactly the particular weighting vector which is traditionally used as a default vector in the first time slot after the transition to the operating state with closed-loop antenna diversity.

UMTS standard (specification TS25.214 of the 3GPP) provides for two operating states with closed-loop antenna diversity, again designated herein as closed-loop mode 1 and closed-loop mode 2. In closed-loop mode 1, a default weighting vector taking the form $w^{(0)}=(1/\sqrt{2};\ \frac{1}{2}(1+j))$ is used. This weighting vector remains unchanged as long as back-coupling information bits with the value 0 are transmitted.

Another embodiment addresses the situation where the known weighting vector is the particular vector, or one of the vectors, from a known finite set of available vectors which exhibits the greatest similarity with the predefined weighting vector. This embodiment of the method is applicable to the closed-loop mode 2 of the UMTS system. In this operating state, a four-bit word is transmitted as back-coupling information, which word contains, in addition to three bits defining the phase difference of the signals emitted from the two antennas of the base station, information about their relative power; these powers may stand in a ratio of 0.8:0.2 or 0.2:0.8 to one another. The default vector used in closed-loop mode 2, however, provides for an intensity ratio of 0.5:0.5. It is not possible, therefore, to deliver back-coupling information to the base station which would lead to retention of the default weighting vector. In such a case, the back-coupling information usefully will be determined such that among the various weighting vectors standing at the disposal of the base station it represents the particular weighting vector or one of the weighting vectors that bears the greatest similarity to the default weighting vector.

In a radio communication system like the UMTS system which supports multiple operating states with closed-loop antenna diversity it also may be desirable, for ease of implementation, to determine the back-coupling information to be transmitted before the availability of a current measurement so that irrespective of which of the operating states with closed-loop antenna diversity has been selected the same back-coupling information is delivered.

Another embodiment considers that, for whatever reasons, shortly before switching to an operating state with closed-loop antenna diversity, the user station has performed a measurement on the downlink signal of the base station. In such a case, the back-coupling information produced from this measurement can, of course, be immediately delivered to the base station.

The present method preferably will be used in a UMTS radio communication system. Here, it enables initialization of the weighting vector in the event, not yet dealt with under the currently valid standard, of a transition to an operating state with closed-loop antenna diversity coinciding with an interruption of the downlink signal so that the back-coupling information needed by the base station cannot be determined by the user station.

The back-coupling information delivered in such a case until the end of the downlink interruption preferably will consist of zeros.

If the operating state with antenna diversity is the closed-loop mode 1 of the UMTS system, then the transmitting of zeros results in the base station using the default weighting vector $w^{(0)}=(1/\sqrt{2};\ \frac{1}{2}(1+j))$ predefined for emitting the first time slot after the transition to closed-loop mode 1 until such time as the user station has carried out a measurement which shows another weighting vector to be better suited and the back-coupling information relating thereto has been transmitted to the base station. If the operating state with back-coupling is closed-loop mode 2, then it is impossible to reuse the weighting vector (½; −½) used for the first time slot after transition to closed-loop mode 2, after a complete word of the back-coupling information has been transmitted. The back-coupling information allows only relative powers of the two antenna elements of 0.2:0.8 or 0.8:0.2 to be specified. Among the weighting vectors which are available in closed-loop mode 2, the vectors (0.2; −0.8) or (0.8; −0.2) are most similar to the default weighting vector, since they exhibit the same relative phase position of vector components. They can be opted for under the UMTS standard with the back-coupling information words 0000 and 0001. For ease of implementation, only zeros will be transmitted in closed-loop mode 1 and 2 as back-coupling information.

Additional features and advantages of the present invention are described in, and will be apparent from, the following Detailed Description of the Invention and the Figures.

BRIEF DESCRIPTION

DETAILED DESCRIPTION

Figure 1:
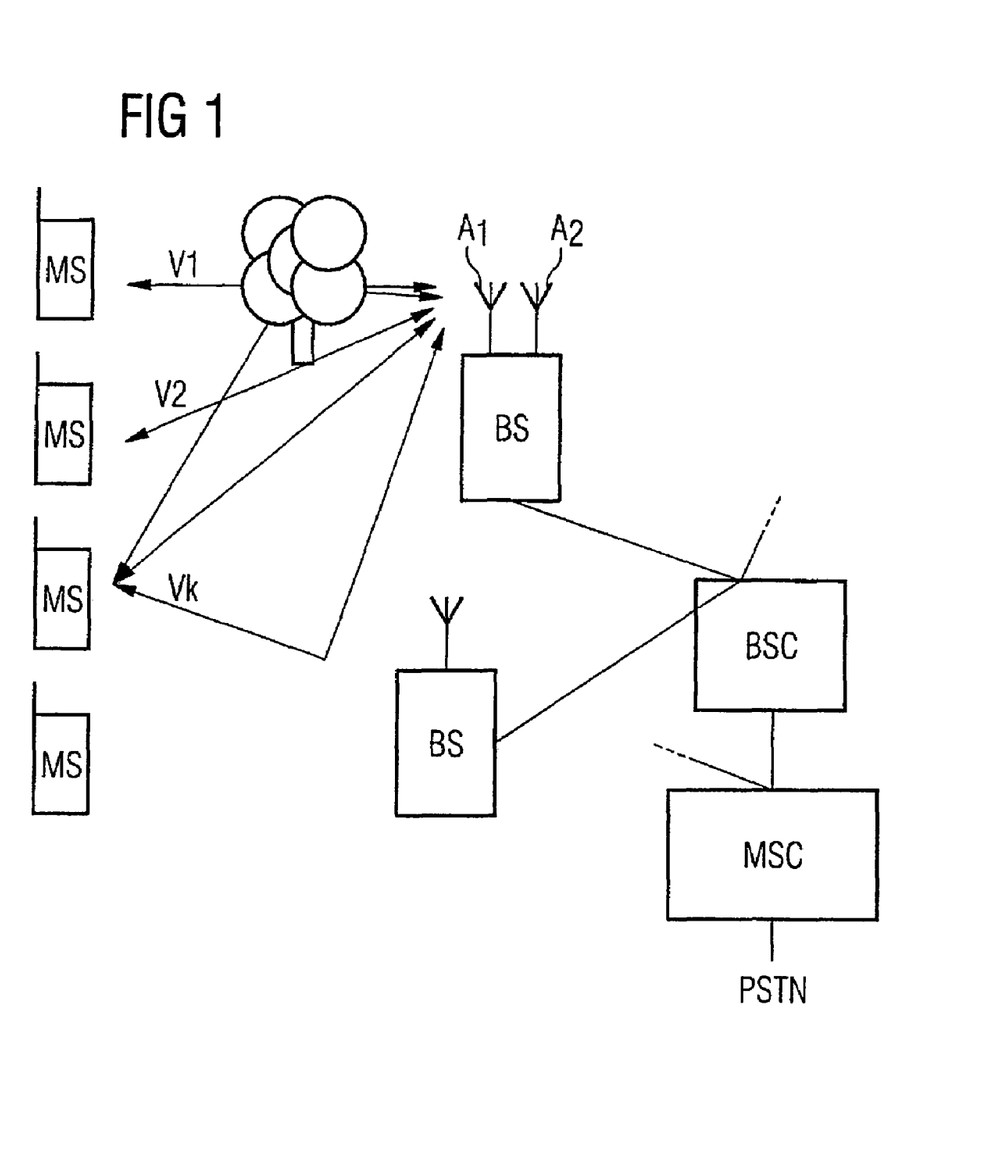
FIG. 1 shows a block diagram of a UMTS radio communication system in which the present invention can be applied.

FIG. 1 shows the structure of a radio communication system in which the present invention can be used. It consists of a large number of mobile switching centers MSC which are networked with one another or establish access to a fixed network PSTN. Furthermore, these mobile switching centers MSC are, in each case, connected to at least one base station controller BSC. Each base station controller BSC, in turn enables a connection to at least one base station BS. Such a base station BS can establish via a radio interface a communication link to user stations MS. The base station BS is equipped with antenna equipment including multiple antennas; here, two antennas $A_1$, $A_2$. These antennas $A_1$, $A_2$ are loaded by the base station BS with a downlink signal intended for a defined user station MS, whereby at least during the emission of the user data of the downlink signal this is given to the antennas $A_1$, $A_2$ multiplied with coefficients w1, w2 of a weighting vector W in order to direct the downlink signal selectively to the user station MS concerned.

The user stations MS are, through measurements which they perform on the downlink signal, able to estimate an optimum phase and intensity relationship between the portions of the downlink signal emitted by the two antennas $A_1$, $A_2$ which would allow reception of the downlink signal with maximum field strength. The technology for carrying out such measurements is known and is not explained here as it does not form part of the present invention.

A radio communication system compliant with the UMTS standard is examined as an example below. Such a system has, in addition to types of operating mode without antenna diversity and with open-loop antenna diversity, two operating modes with closed-loop antenna diversity, again designated closed-loop mode 1 and closed-loop-mode 2, which differ in terms of the format of the back-coupling information which is transmitted from the user stations MS to the base station BS in order to indicate to the base station BS the weighting vector W with which the downlink signal should be weighted so as in each case to be optimally receivable at a user station MS.

In the UMTS system, the uplink signal and the downlink signal are subdivided into frames which each provide fifteen time slots for user data transmission between the base station BS and the user station MS. In the uplink signal, a bit is available in each of these time slots for the transmission of back-coupling information.

In closed-loop mode 1, the user station MS uses the channel CPICH emitted by both antennas $A_1$, $A_2$ of the base station BS in order to calculate, with the aid of the weighting vector, a phase adjustment to be undertaken on the downlink signal emitted by the two antennas $A_1$, $A_2$. This calculation is performed for each time slot in which the base station BS transmits the downlink signal. The user station MS forms from the measured optimum phase adjustment Φ a quantized phase adjustment $\Phi_Q$ according to the formula $$\Phi_Q = \begin{cases} \pi & \text{if } \pi/2 < \Phi - \Phi_r(i) \leq 3\pi/2\pi \\ 0 & \text{otherwise} \end{cases} \quad (1)$$

where $$\Phi(i)_t = \begin{cases} 0 & \text{if } i = 0, 2, 4, 6, 8, 10, 12, 14, \\ \pi/2 & \text{if } i = 1, 3, 5, 7, 9, 11, 13 \end{cases} \quad (2)$$

where i indicates the number of a time slot in a frame. If $\Phi_Q$=0, the user station MS transmits a back-coupling information bit with the value "0". If $\Phi_Q$=π, the value "1" is transmitted. When determining the weighting vector used by it W=($w_1$, $w_2$), the base station takes into account in each case the last and penultimate bits of back-coupling information in accordance with the following formula $$w_1 = \frac{1}{\sqrt{2}} \quad (3)$$

$$w_2 = \frac{\sum_{i=n-1}^{n} \cos(\phi_i)}{2} + j\frac{\sum_{i=n-1}^{n} \sin(\phi_i)}{2}$$

where $\Phi_i$ can assume the values 0, π, π/2, −π/2 as per the table below:

TABLE 1

| i | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| $\Phi_Q$ = 0 | 0 | π/2 | 0 | π/2 | 0 | π/2 | 0 | π/2 | 0 | π/2 | 0 | π/2 | 0 | π/2 | 0 |
| $\Phi_Q$ = 1 | π | −π/2 | π | −π/2 | π | −π/2 | π | −π/2 | π | −π/2 | π | −π/2 | π | −π/2 | π |

The component $w_1$ of the weighting vector for the antenna $A_1$ is always $w_1=1/\sqrt{2}$.

Conventionally, only initialization of closed-loop mode 1 is provided for in the first time slot of a frame. The way in which this is carried out is that a default weighting vector $W^{(0)}$ with a second component $w_2=\frac{1}{2}(1+j)$ is assumed before reception of a first back-coupling word and after receipt of the first word of back-coupling information in the time slot 0 of the uplink signal $w_2$ is calculated in accordance with the following formula $$w_2 = \frac{\cos(\pi/2)+\cos(\phi_0)}{2} + j\frac{\sin(\pi/2)+\sin(\phi_0)}{2} \quad (4)$$

where, depending on the value of the back-coupling information, $\Phi_Q$ assumes the value 0 or $\pi$ in accordance with the above table.

Figure 2:
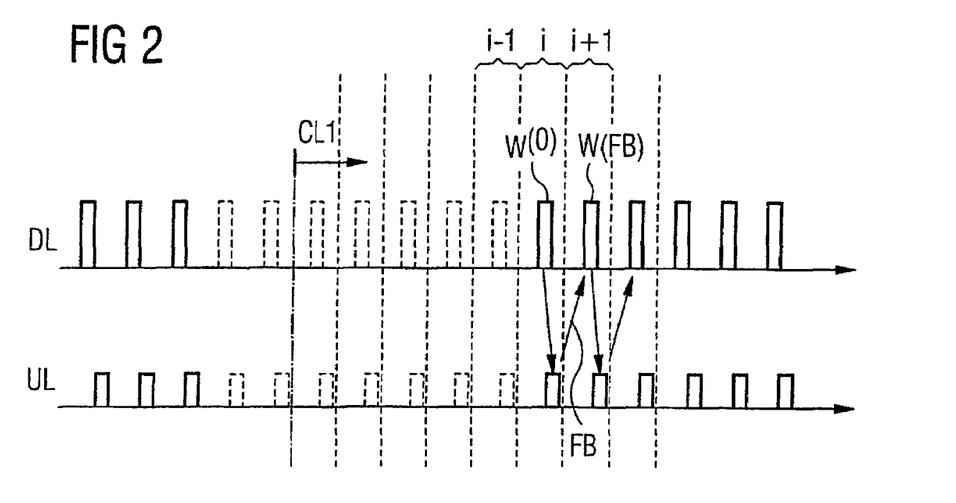
FIG. 2 shows the temporal course of uplink and downlink signals in the event of the UMTS system switching to closed-loop mode 1 while both the uplink and downlink signals are interrupted.

FIG. 2 illustrates the temporal course of uplink and downlink signals in the transition to closed-loop mode 1 according to the present invention. Boxes in the top half of the diagram in FIG. 2 each represent time slots of the downlink signal DL transmitted from the base station BS to the user station MS, a box drawn in solid lines designating a time slot in which a signal is transmitted and boxes drawn in dashed lines designating time slots in which the transmission of the signal is interrupted in order to give the user station MS the opportunity to carry out measurements on the signals of neighboring base stations. The bottom half of the diagram illustrates in a analogous way the uplink signal UL, with boxes in solid lines likewise designating timeslots in which a signal is transmitted and boxes drawn in dashed lines designating time slots in which no signal is transmitted. Arrows pointing downward symbolize the transmission of a downlink time slot in closed-loop mode, while arrows pointing upward symbolize the transmission of back-coupling information.

The transition of the system to closed loop mode 1 (CL1) shown by a vertical dotted-dashed line falls within a period in which uplink and downlink signals are interrupted. When in time slot i of the downlink signal DL, the base station BS starts to transmit again while it has not yet received any back-coupling information from the user station MS. It therefore transmits in time slot i with the default weighting vector $W^{(0)}=(1/\sqrt{2},(1+j))$.

During the time slot i of the downlink signal DL, the user station MS is for the first time able to carry out a measurement and delivers a back-coupling word FB via which the base station BS calculates an updated weighting vector w(FB) which is used for weighting the downlink signal in time slot i+1. The component $w_2$ of the vector W(FB) is calculated in accordance with formula (3), a fictitious phase-adjustment value $\Phi_{i-1}$, being set to $\pi/2$ for the immediately preceding (i–1)th time slot in which no downlink signal has been transmitted if i=0, 2, 4, 6, 8, 12 or 14 and to $\pi/2$ if i=1, 3, 5, 7, 9, 11 or 13. In this way, correct initialization of the weighting vector is possible in any time slot of the frame. In other words, the value selected as the fictitious phase adjustment value $\Phi_{i-1}$, is that which would have been produced even if in time slot (i–1) a back-coupling information bit specifying the default weighting vector had been transmitted with the value 0.

Figure 3:
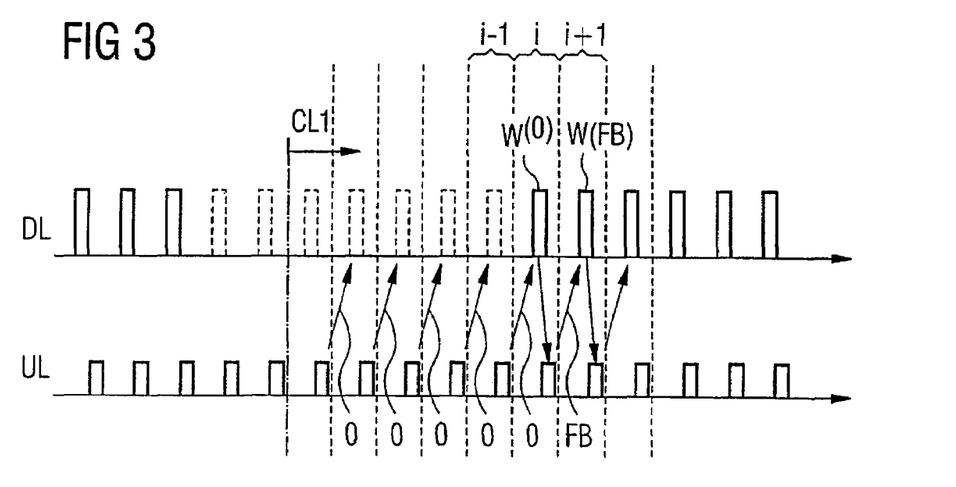
FIG. 3 shows the temporal course of uplink and downlink signals if the switch to closed-loop mode 1 takes place during an interruption solely in the downlink signal.

FIG. 3 shows the case where at the time of the transition to closed-loop mode 1 only the downlink signal DL is interrupted, but not the uplink signal UL. If in this situation the base station BS receives the uplink signal, then it expects to find back-coupling information in each time slot of the latter, but immediately after the start of closed-loop mode 1 the user station MS has not yet been able to perform any measurement on the downlink signal from which it could derive back-coupling information. In this situation, the user station MS transmits in each time slot of the uplink signal back-coupling information with the value 0. As can be seen from formula (3), the transmission of this back-coupling information for the base station BS always yields the default weighting vector $W^{(0)}$. This is, therefore, used by the base station BS for weighting the first time slot i after the interruption. The user station MS derives during the time slot i of the downlink signal DL a back-coupling bit FB which is transmitted to the base station BS and enables the base station BS to select for the time slot (i+1) an updated weighting vector W(FB).

During the downlink interruption, the user station MS delivers to a certain extent dummy back-coupling information which has a predefined content which does not derive from an actual measurement. The base station BS finds in each time slot of the uplink signal UL, irrespective of whether it has been produced in an interruption of the downlink signal DL or not, evaluable back-coupling information, so that when the uplink signal UL is evaluated no distinction has to be made between periods in which the downlink signal DL is transmitted regularly and those in which it is interrupted. Since the base station BS is supplied continuously with back-coupling information, no special initialization procedure is necessary after the end of the interruption.

Figure 4:
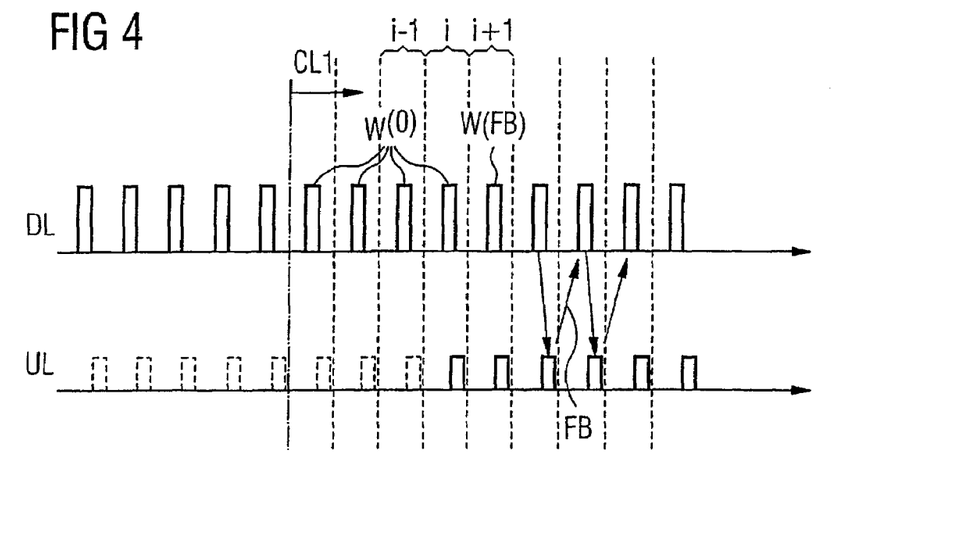
FIG. 4 shows the temporal course of uplink and downlink signals if the switch to closed-loop mode 1 takes place during an interruption solely in the uplink signal.

FIG. 4 relates to the case where the switch to closed-loop mode 1 takes place during an interruption in the uplink signal UL, but the downlink signal DL is being transmitted normally. As long as the interruption in the uplink signal continues, the base station BS receives no back-coupling information from the user station MS, even if the latter receives signals in the common pilot channel (CPICH) of the downlink signal and is capable of measuring a phase adjustment. The first time slot after the interruption, in which time slot the user station MS transmits an uplink signal, is time slot i. In this time slot i, the user station MS transmits the back-coupling information FB determined currently from the downlink (CPICH), and the base station BS determines via the back-coupling information FB the weighting vector W(FB) used in time slot i+1 of the downlink signal. This determination is carried out in the same way, depending on the number i of the time slot, as described above with reference to FIG. 2.

Figure 5:
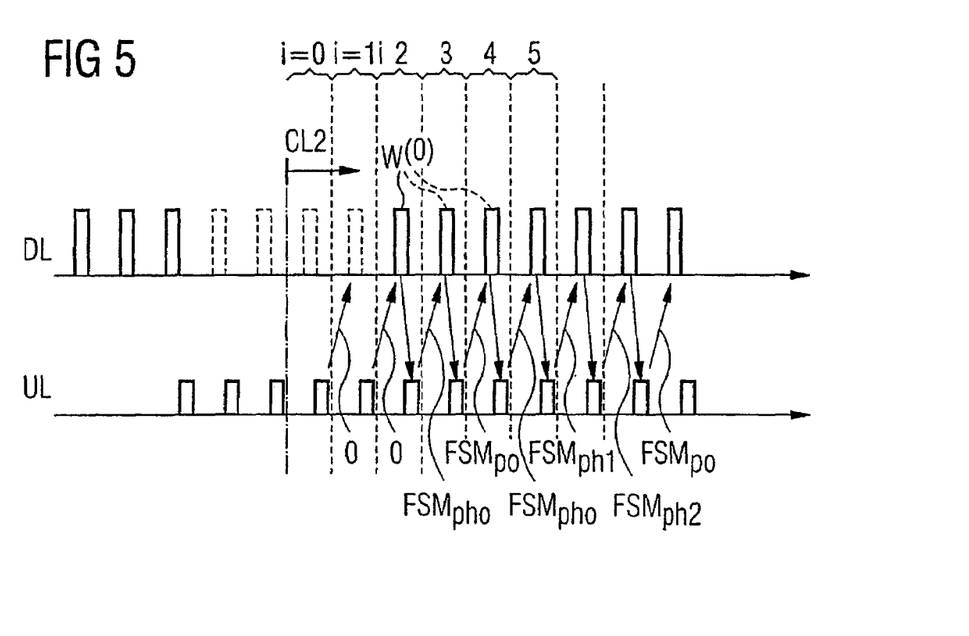
FIG. 5 shows the temporal course of uplink and downlink signals if the system switches to closed-loop mode 2 during a downlink interruption.

FIG. 5 illustrates the case where a switch to closed-loop mode 2 (CL2) occurs during an interruption in the downlink signal.

In closed-loop mode 2, the back-coupling information is delivered to the base station BS in the form of four-bit data words, whereby the three most significant bits $FSM_{ph}$ of each data word specify the relative phase length of the two components of the weighting vector and the least significant bit $FSM_{po}$ specifies the ratio of their amounts. Transmission of such a four-bit data word can, in each case, commence only in the time slots 0, 4, 8, 12 of a UMTS frame, while the bit $FSM_{po}$ of the data word beginning in time slot 12 is not transmitted.

If, in the switch to closed-loop mode 2 at the beginning of a frame, neither uplink nor downlink signal is interrupted, then a standard weighting vector $W^{(0)}=(\frac{1}{2},-\frac{1}{2})$ is used in a known way for transmitting the time slot 0 (i=0) in closed-loop mode 2 for which the base station BS does not yet have any back-coupling information from the user station MS available. In the subsequent time slots of the uplink signal UL, the user station MS delivers in sequence in each case the four bits of the back-coupling word. Here, the three phase bits $FSM_{ph}$ of the back-coupling word each specify phase differences between the antennas $A_1$, $A_2$ as per the following table

TABLE 2

| $FSM_{ph}$ | Phase difference between antennas $A_1$, $A_2$ [rad] |
|---|---|
| 000 | $\pi$ |
| 001 | $-3\pi/4$ |
| 011 | $-\pi/2$ |
| 010 | $-\pi/4$ |
| 110 | 0 |
| 111 | $\pi/4$ |
| 101 | $\pi/2$ |
| 100 | $3\pi/4$ | and the power back-coupling bit $FSM_{po}$ enables a distinction to be made between the following relative transmit powers of the antennas $A_1$, $A_2$:

TABLE 3

| $FSM_{po}$ | $A_1$ power | $A_2$ power |
|---|---|---|
| 0 | 0.2 | 0.8 |
| 1 | 0.8 | 0.2 |

The base station BS commences, even before transmission of the four-bit back-coupling word is complete, updating the weighting vector used via the back-coupling bits transmitted in succession as per the following table, a dash (-) in the table designating a bit not yet transmitted.

| $FSM_{ph}$ | Phase difference between antennas $A_1$, $A_2$ [rad] |
|---|---|
| --- | $\pi$(corresponds to default initialization vector) |
| 0-- | $\pi$ |
| 1-- | 0 |
| 00- | $\Pi$ |
| 01- | $-\pi/2$ |
| 11- | 0 |
| 10- | $\pi/2$ |
| 000 | $\pi$ |
| 001 | $-3\pi/4$ |
| 011 | $-\pi/2$ |
| 010 | $-\pi/4$ |
| 110 | 0 |
| 111 | $\pi/4$ |
| 101 | $\pi/2$ |
| 100 | $3\pi/4$ |

Let us again examine the case shown in FIG. 5 where at the beginning of a frame a switch has been made to closed-loop mode 2 and no transmissions are occurring in the time slots i=0, 1 of the downlink signal DL. In this case, the user station MS delivers back-coupling bits with the value 0 to the base station BS until the downlink interruption has ended and the user station MS is for the first time able to perform a measurement on the CPICH. In the example shown in FIG. 5, the user station MS delivers in time slots i=0, 1 a back-coupling bit with the value 0, which is interpreted by the base station BS in accordance with Table 4 above as a phase difference of $\pi$, specified by the user station MS, between the antennas $A_1$, $A_2$.

Only via the CPICH during the downlink time slot 2 is the user station MS actually able to carry out a measurement.

According to an embodiment, the user station MS delivers as a measurement result the lowest significant phase bit $FSMph,2$ of the back-coupling data word expected in this time slot 2 by the base station BS as back-coupling information. The base station BS, however, ignores this phase bit as it does the power bit FSMpo delivered in the subsequent time slot 3 and continues to use the default weighting vector W(0); i.e., it behaves as if zeros had been transmitted instead of the two back-coupling bits.

Only from time slot 4, in which the user station MS commences transmission of a new complete back-coupling word, does the base station BS begin to take account of the back-coupling information delivered.

According to another embodiment, it also could be provided that after the end of an interruption in the downlink signal the user station MS constantly transmits zeros in place of the residual bits of a started back-coupling data word and only starts delivering current back-coupling information with the start of a new data word in one of the time slots 0, 4, 8 or 12.

If, in deviation from the representation of FIG. 5, the interruption of the downlink signal extends across and possibly beyond time slot 3, then the user station MS also delivers in time slot 3 a back-coupling bit with the value 0, and the weighting vector used for the fifth (i=4) time slot of the downlink signal assumes the value W=(0.2; −0.8). This vector is no longer identical to the weighting vector originally predefined (0.5; −0.5), but among the weighting vectors available to the base station BS, together with the vector (0.8; 0.2) it is the one which bears the greatest similarity with the predefined weighting vector. The scalar product of vectors standardized to a uniform amount can be used, for example, as a measure of the similarity of two vectors.

Figure 6:
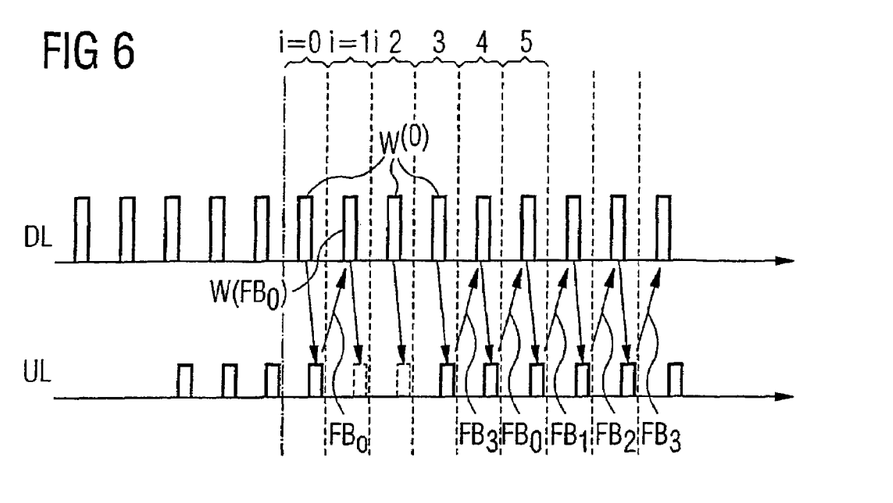
FIGS. 6 and 7 show two variants of the temporal course of uplink and downlink signals in the event of an interruption in the uplink after a switch to closed-loop mode 1 or 2.

FIG. 6 shows an uplink interruption in time slots i=1, 2 in a closed-loop mode. During and before transmission of the downlink signal in time slot 0, the user station MS has been able to determine back-coupling information; it delivers a first bit $FB_0$ of this to the base station BS in time slot 0 of the uplink before the interruption. This is evaluated by the base station BS in the conventional manner, as is known for closed-loop mode 1 and 2 of the UMTS system. The base station BS transmits in time slot 1 of the downlink with a weighting vector $w(FB_0)$ updated via this back-coupling bit. In the subsequent time slots 1,2, the base station BS receives no uplink signal and also consequently, no further back-coupling information. The base station BS then discards the first back-coupling bit and transmits the downlink signal in timeslots 2 and 3 with the default weighting vector. In the case of closed-loop mode 1, the weighting vector can be updated after the end of the interruption using the back-coupling bit $FB_3$ transmitted in uplink time slot 3 in the same way as described above for the situation where the transition to closed-loop mode 1 falls within an uplink interruption. In the case of closed-loop mode 2, the base station BS also ignores the back-coupling bit $FB_3$ transmitted in uplink time slot 3 (which corresponds here to the power bit $FSM_{po}$) and evaluates only the back-coupling bit transmitted in uplink time slot 4.

Figure 7:
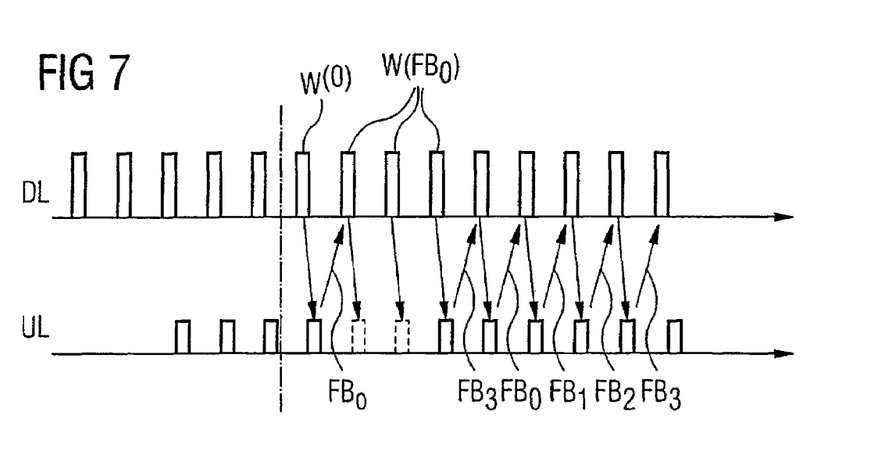

FIG. 7 shows an alternative method for closed-loop mode 2. Updating of the weighting vector to $w(FB_0)$ after transmission of the back-coupling bit $FB_0$ before the interruption is as described above with reference to FIG. 6. During the interruption, the base station BS uses in the downlink the weighting vector $w(FB_0)$ until it receives a new first bit $FB_0$ of another back-coupling word. The last bit $FB_3$ of the incompletely transmitted back-coupling word is ignored.

Through delays in the transmission (runtimes) and calculation of the weighting vector, it is possible that the updating of the weighting vector W(FB) based on a back-coupling bit transmitted in time slot i will not occur until time slot (i+2) or even later. The methods specified also can be used in such circumstances Although the present invention has been described with reference to specific embodiments, those of skill in the art will recognize that changes may be made thereto without departing from the spirit and scope of the present invention as set forth in the hereafter appended claims.

The invention claimed is:

1. A user station in a UMTS radio communication system, comprising:

means for receiving a downlink signal from a base station;

means for transmitting an uplink signal to the base station; and     means for determining, in an operating state with closed-loop antenna diversity, via measurements of the downlink signal a weighting vector for ensuring reception of the downlink signal at the user station and for delivering feedback information to the base station, the feedback information representing the determined weighted vector; and     means for transmitting a feedback information, via the user station to the base station, between a time of the transition to the operating state with closed-loop antenna diversity and completion of a first measurement after the transition, wherein the feedback information represents a pre-determined weighting vector determined before the time of the transition, and wherein in case that at the time of the transition to the operating state with closed loop antenna the transmission of the downlink signal is interrupted, the user station, between the time of the transition to the operating state with closed loop antenna diversity and the determination of a current weighting vector, delivers zeros as the feedback information.

2. A user station for a radio communication system as claimed in claim 1, wherein the determined weighting vector is the predefined weighting vector.

3. A user station for a radio communication system as claimed in claim 1, wherein the determined weighting vector is selected from a plurality of vectors which exhibit at least some similarity with the defined weighting vector.

4. A user station for a radio communication system as claimed in claim 1, wherein the determined weighting vector is obtained in a measurement carried out before the transition to the operating state with closed-loop antenna diversity.

* * * * *